US012054951B2

(12) United States Patent
Leitner

(10) Patent No.: US 12,054,951 B2
(45) Date of Patent: Aug. 6, 2024

(54) HANDRAIL FOR A BOARD

(71) Applicant: INTERCOM—DR. LEITNER SRL, Campo di Trens (IT)

(72) Inventor: Christof Leitner, Wiesen/Pfitsch (IT)

(73) Assignee: INTERCOM—DR. LEITNER SRL, Campo di Trens (IT)

( * ) Notice: Subject to any disclaimer, the term of this patent is extended or adjusted under 35 U.S.C. 154(b) by 0 days.

(21) Appl. No.: 17/754,859

(22) PCT Filed: Oct. 28, 2020

(86) PCT No.: PCT/EP2020/080302
§ 371 (c)(1),
(2) Date: Apr. 14, 2022

(87) PCT Pub. No.: WO2021/083966
PCT Pub. Date: May 6, 2021

(65) Prior Publication Data

US 2024/0093503 A1 Mar. 21, 2024

(30) Foreign Application Priority Data

Oct. 31, 2019 (DE) ..................... 10 2019 129 471.1

(51) Int. Cl.
*E04F 11/18* (2006.01)
*A63B 71/02* (2006.01)
*G09F 23/00* (2006.01)

(52) U.S. Cl.
CPC ............ *E04F 11/18* (2013.01); *A63B 71/022* (2013.01); *G09F 23/0066* (2013.01);
(Continued)

(58) Field of Classification Search
CPC ......... E04F 2011/1872; G09F 23/0066; A63B 71/022; F21W 2111/08; A63C 19/02; A63C 19/06; A63C 19/08; A63C 19/10
(Continued)

(56) References Cited

U.S. PATENT DOCUMENTS 3,131,871 A * 5/1964 Foulds .................... E01F 9/669
362/222
4,361,314 A * 11/1982 Ohlson ................. E04F 11/181
403/321
(Continued)

FOREIGN PATENT DOCUMENTS

DE 78 20 642 U1 10/1978
DE 10 2010 022 853 A1 12/2011
(Continued)

OTHER PUBLICATIONS

International Search Report issued in PCT/EP2020/080302; mailed Feb. 10, 2021.

*Primary Examiner* — Alexander K Garlen
(74) *Attorney, Agent, or Firm* — Studebaker & Brackett PC

(57) ABSTRACT

The invention relates to a board for a sports facility comprising a handrail at its upper edge, the handrail having a handrail body having a profile extending in a longitudinal direction, in the outer surface of which a mounting channel runs essentially over the entire length of the handrail, which mounting channel is designed to mount a flat information element. The invention further relates to such a handrail for a board, a mobile sports facility and a method for constructing a mobile sports facility.

24 Claims, 3 Drawing Sheets

(52) U.S. Cl.
CPC ..... *A63B 2225/74* (2020.08); *A63B 2244/186* (2013.01); *E04F 2011/1872* (2013.01)

(58) Field of Classification Search
USPC ......................................... 362/145, 146, 152
See application file for complete search history.

(56) References Cited

U.S. PATENT DOCUMENTS

| | | | | |
|---|---|---|---|---|
| 5,402,988 | A | 4/1995 | Eisele | |
| 5,612,665 | A * | 3/1997 | Gerhardsen | G09F 19/22 340/815.4 |
| 5,720,678 | A * | 2/1998 | Korthauer | A63C 19/00 473/415 |
| 7,311,464 | B2 * | 12/2007 | Swartz | A63C 19/00 404/71 |
| 2004/0086333 | A1 * | 5/2004 | Swartz | A63C 19/00 404/1 |
| 2011/0138732 | A1 | 6/2011 | Piano et al. | |
| 2013/0058074 | A1 * | 3/2013 | Somei | F21V 33/006 362/145 |

FOREIGN PATENT DOCUMENTS

| | | | | | |
|---|---|---|---|---|---|
| DE | 20 2017 104 424 | U1 | | 10/2018 | |
| DE | 10 2009 005 533 | B4 | | 1/2020 | |
| EP | 0 190 913 | A2 | | 8/1986 | |
| ES | 1 078 959 | U | | 4/2013 | |
| FI | 123606 | B | * | 8/2013 | |
| JP | 2005256371 | A | * | 9/2005 | |
| KR | 20090007752 | U | * | 7/2009 | |
| KR | 20110000610 | U | * | 1/2011 | |
| KR | 20150111489 | A | * | 10/2015 | |
| WO | WO-8904410 | A1 | * | 5/1989 | |
| WO | WO-9625729 | A1 | * | 8/1996 | G08B 7/062 |
| WO | 2007/143718 | A2 | | 12/2007 | |

* cited by examiner

HANDRAIL FOR A BOARD

The invention relates to a handrail for a board, in particular for a mobile or permanently installed sports facility such as a roller-skating rink, soccer rink or ice skating rink.

In sports, a board refers to the border of a playing field. It serves as a safety or guiding element for persons and can also be used for the course of the game (for example, for a puck or other game object to bounce off). Typical materials for boards are wood, steel, plastic, concrete and glass. A board is often permanently connected to a sports facility or a part thereof. However, it can also be a board designed for mobile applications, that is, such that it can be mounted fixed in place, but can also be easily dismantled again or broken down into individual board elements. Such a mobile board is suitable, for example, for securing transportable sports facilities such as mobile soccer fields, ice rinks or roller-skating rinks. For example, a mobile skating rink requires a perimeter board to prevent skaters from slipping off the ice surface and injuring themselves or bystanders. Boards may have a handrail, typically made of plastic, that runs along the upper edge of the board or board element.

Board advertising, that is, the presentation of advertising on surface of the board, is firmly established in the field of sports.

The disadvantage of the prior art is that up to now, it has not been possible to optimally provide handrails of boards with (replaceable) information elements. Stickers can of course be stuck on the handrails of the boards, but these are not protected from external mechanical influences. For example, stickers on handrails at mobile ice-skating rinks are unsightly or partially detached in a short time due to intensive contact with the handrails by ice skaters.

It is an object of the present invention to provide a board with a handrail or a handrail for a board, the handrail being able to receive and effectively protect information elements.

This object is achieved by a board according to claim 1 and a handrail according to patent claim 9 and a mobile sports facility according to patent claim 10 and a method according to patent claim 11.

A board according to the invention for a (preferably mobile) sports facility comprises a handrail on its upper edge, the handrail having a handrail body having a profile extending in a longitudinal direction, in the outer surface of which a mounting channel runs essentially over the entire length of the handrail, the mounting channel being designed for mounting a flat (and in particular also strip-shaped) information element. The expression "essentially" means here and in the following in this regard that the mounting channel runs over more than 80% of the length over the entire course or only individually on a respective element, preferably over more than 90%, in particular over the entire length. The course is preferably rectilinear, which allows an information element to be displaced in the longitudinal direction of the handrail (orthogonal to its cross-sectional area).

A handrail according to the invention is designed for attachment to a board (for shaping a board according to the invention), in particular to a mobile board element. The handrail comprises a handrail body having a profile extending in a longitudinal direction, in the outer surface of which a mounting channel runs essentially over the entire length of the handrail, the mounting channel being designed for mounting a flat (and in particular also strip-shaped) information element. In this case, the handrail preferably has a groove in the lower region of the handrail body, into which groove the upper edge of a previously known board can be inserted. However, other shapes for fastening to the board are also possible. For example, (alternatively or additionally) the handrail body can have a tongue on its underside, which tongue can engage in a predefined or prefabricated groove in the upper edge of a board.

At this point, it is noted that the invention is suitable for both permanently installed and mobile sports facilities. Particularly in permanently installed sports facilities, it is preferred if a slot is formed in handrails or between handrail elements in the region of a mounting channel, by means of which it is possible to remove or insert information elements from the outside into the handrail. The invention is particularly advantageous in mobile board elements, since information elements can already be easily attached to the handrails during assembly.

A mobile sports facility according to the invention, preferably a soccer field, a roller-skating rink or an ice rink, comprises a board according to the invention or at least one handrail according to the invention.

Further particularly advantageous configurations and developments of the invention result from the dependent claims and the following description, wherein the claims of a specific category can also be developed according to the dependent claims of another category and features of different embodiments can be combined to form new embodiments.

The board is preferably a board element for a mobile sports facility. In particular, a board element has a length of less than 5 m, preferably less than 3 m, or even less than 2.5 m. The handrail should preferably have at least the length of the board element. It does not necessarily have to end with the side edges of the board element (that is, the edges with which board elements abut one another), but can also be arranged offset thereto in order to serve to fasten board elements.

An information element naturally has a certain minimum size, since otherwise it cannot serve as an information element because it is not perceived. The maximum length is usually dictated by the length of the mounting channel of the handrail. However, it is also conceivable that a single information element can be slid or glued into a plurality of handrails of a plurality of board elements or fastened there in some other way and then these handrails are connected to one another. In this case, the information element can also be longer than the mounting channel in the handrail of a board element. Basically, it is also possible for an information element to act as a connector of board elements. It can also be the length of the mounting channel or be shorter for this purpose. It is then inserted such that it connects two handrails to one another.

The width and depth of the mounting channel conform to the height and thickness of those information elements that are intended to be arranged in the mounting channel. Since, as mentioned above, the information elements must have a certain minimum size in order to be able to fulfill an indication function at all and (at least if they can be inserted) must also have a certain minimum thickness in order to have sufficient mechanical strength, the mounting channel must also have a corresponding minimum width and minimum depth.

A preferred minimum width of the mounting channel is 2 cm, preferably 4 cm, in particular 6 cm. A preferred maximum width is 20 cm, preferably 10 cm, in particular 8 cm. It is preferred that the width, apart from possible clamping elements or the like, is constant over the entire length of the mounting channel. Small, elastic shaped pieces can preferably be used as clamping elements (formed in one piece with the handrail or applied as additional elements), which protrude into the mounting channel, preferably a maximum of 5 mm, in particular a maximum of 3 mm, and can be used for clamped fastening of information elements. Of course, clamping elements can also be arranged on or at information elements.

A preferred minimum depth of the mounting channel is 2 mm, preferably 5 mm, in particular 10 mm. A preferred maximum depth is 5 cm, preferably 3 cm, in particular 2 cm. It is preferred that the depth in this case is constant over the entire length of the mounting channel (optionally apart from said possible clamping elements).

The mounting channel is preferably designed such that an information element can be glued, clamped, screwed into it or fixed by means of a magnetic fastening. The mounting channel is particularly preferably designed such that an information element can be inserted into it. This means that the cross section of the mounting channel is preferably designed such that an information element is prevented from tipping out. The mounting channel preferably has an angular U-profile having inwardly projecting edge regions or a bead on the edges. It could also be said that the inner volume of the mounting channel has an undercut for holding an information element in a form-fitting manner. Of course, the mounting channel can also be shaped without an undercut, for example, if the information element is fixed by adhesive or magnetic forces.

In principle, the mounting channel (that is, also an inserted information element) can be located at any desired position of the handrail, for example, on the upper side thereof. However, it is preferred that a mounting channel is located on at least one side of the handrail (that is, runs approximately in a plane parallel to the board wall). With regard to an ice rink, this would be the side facing the ice rink ("inside") or the side facing away from the ice rink ("outside"). This has the advantage that no snow can cover the information element and the mechanical stress caused by hand touches is minimized. However, this also has the consequence that, in contrast to handrails typically used, the shape of the handrail according to the invention now has a considerable volume of material on the side in which the mounting channel is formed.

In this regard, it is preferred that a mounting channel is configured on both sides of the handrail (that is, both on the inside and on the outside), the mounting channel preferably being designed for inserting an information element on one side and comprising a permanently attached information element on the other side. This has the advantage that an operator of a mobile sports facility can operate his own advertising on the one hand (for example, the name of the rental company of the mobile sports facility on the outside) and the organizer of a sports competition on the other (for example, the advertising of the alternating sponsors on the inside).

It is also preferred that an information element is fixedly attached (or an item of information is painted or printed) on the bottom of a mounting channel and the mounting channel is shaped so that a further information element can be slid over it. This has the advantage that ready-made advertising can be individually covered by variable information or advertising elements.

A preferred handrail having a laterally arranged mounting channel has the following shape: A hand rest body is formed above the handrail body. Said hand-rest body preferably has a width of at least 2 cm, in particular at least 5 cm. The maximum width is 10 cm, but preferably less than 8 cm. In addition to a groove for mounting the upper edge of the board, the hand rest body can have a further groove over its length, which groove preferably runs essentially centrally in the handrail body on the underside thereof and facilitates spreading the handrail apart for attachment to the upper edge of the board. In addition to the hand rest body, the handrail body comprises a channel body formed on at least one side of the handrail body essentially orthogonally to the hand rest body ("essentially" means here at an angle between 80 and 100°), so that the hand rest body and channel body form an L-shape (for one channel body) or form a, preferably angular, U-shape (for two channel bodies), wherein in the latter case, the two channel bodies can also have different widths.

The board preferably comprises a strip-shaped information element arranged in the mounting channel, which information element is preferably held in the recess in a form-fitting manner and/or is fixed by means of adhesive.

The handrail can be part of the board (or a board element), in particular a formation in its structure (same material as the board). However, it is preferably a separate handrail, in particular made of a different material than the board, which handrail does not form a one-piece component with the board. This means in particular that the handrail can be connected to the upper edge of the board, for example, by plugging, clamping, gluing, screwing or magnetic fastening, but is recognizable as a component that can be distinguished from the board, for example, because said hand rail is made of a different material.

The handrail is preferably designed such that it can mount a static information element. A static information element is an information element that, as intended, does not change (except for signs of age). However, the handrail can also preferably be designed such that it is designed to mount a dynamic information element. A dynamic information element is an information element that can change the information it presents in a short interval of time (a single-digit number of seconds, minutes, or hours). This can be a display, for example, or an information element having an integrated lighting element, for example, comprising LEDs or OLEDs. For this purpose, the handrail preferably has at least one electrical contact point, in particular at least two electrical contact points (preferably in the region of the mounting channel) and in particular an electrical feed line from the contact point (the contact points) to a connection unit for connection to a data interface and/or to an electrical power supply.

Particularly preferably, the handrail has a lighting unit, for example, a lamp or LED bar, in the region of the mounting channel (on the support surface (the rear surface on which an information element is intended to rest) and/or the upper side and/or the lower side), which lighting unit is designed and positioned such that light from the lighting unit can illuminate an information element from above, below or behind. For this purpose, part of the mounting channel can be made of a translucent (or transparent) material and the lighting unit can be arranged inside the handrail behind the translucent (or transparent) material. This has the advantage that the lighting unit is protected against mechanical damage, for example, when used as intended and when the boards are set up or dismantled. Of course, an information element should also be translucent in order to be able to use the illumination effectively.

Preferred materials for the handrail are materials from the group of metal (for example, steel or aluminum), wood, fiber composite materials or plastic, with thermoplastic elastomers ("TPE") such as polyurethane being particularly preferred. Elastic materials are particularly preferred, for example, rubber or plastic foams.

In a preferred manufacturing method according to the invention for a handrail according to the invention, the handrail body is manufactured as an extruded body made of plastic or other materials. Alternatively or additionally, the mounting channel can be milled. The entire handrail body can also be milled.

In a preferred subsequent step, the handrail is then attached to an upper edge of a board, for example, by clamping, plugging, screwing and/or gluing. This then forms a board according to the invention (or a board element according to the invention).

An information carrier is preferably also inserted into a mounting channel of the handrail.

A use according to the invention of a board according to the invention relates to the presentation of information, in particular board advertising, on an information carrier introduced into the handrail of the board.

A method according to the invention for setting up a (preferably mobile) sports facility comprises the following steps:

- constructing the board of the (preferably mobile) sports facility using a board according to the invention, in particular board elements according to the invention, and/or a handrail according to the invention.
- (optionally) constructing the floor of the (preferably mobile) sports facility before and/or after the construction of the board.
- attaching and/or introducing, in particular slipping in, flat, in particular strip-shaped, information elements into the handrail of the board. These can be printed panels, for example, but also LED or OLED strips. This step can take place during the construction of the board, for example, before or during the assembly of board elements, or afterwards. Information elements can also be used in particular for fixing two board elements to one another.

BRIEF DESCRIPTION OF DRAWINGS

The invention is explained in more detail below with reference to the attached figures using exemplary embodiments. The same components are provided with identical reference numbers in the various figures. The figures are generally not to scale. Shown are:

FIG. 1 shows an embodiment of a board 1 according to the invention. A mobile board element 1 is depicted here, which here consists of a beam construction having a flat cladding in front and having an upper edge 1*a*. A handrail 2 is arranged on said upper edge 1*a*. Said handrail 2 comprises a mounting channel 3 on one side, which can be the outside here, for example. An information element 4 is just being inserted into this mounting channel 3, specifically in the direction of the arrows indicated. The arrows are intended to depict a motif on the information element 4 here. For example, said arrows can be used to find an exit or show directions to a point of interest. The information element 4 is an elongate plate shaped such that said plate can be easily slipped into the mounting channel 3 and is held thereby in a form-fitting manner.

FIG. 2 shows an embodiment of a handrail 2 according to the invention. Said handrail 2 has a mounting channel 3 into which, as shown in FIG. 1, an information element 4 (not depicted here) can be inserted. In order to hold an information element 4 in a form-fitting manner, the mounting channel 3 has an edge region 5 on the front that projects inwards and the inner volume of the mounting channel 3 therefore has an undercut for holding an information element 4 in a form-fitting manner. The handrail 2 depicted here is also the handrail body 2 at the same time. Said handrail body 2 has a very large groove (cavity inside) with which the handrail body can encompass an upper edge 1*a* of a board 1, as depicted in FIG. 1.

Two clamping elements 6 are delineated in the central region of the mounting channel 3. Said clamping elements are slight protuberances in the support surface 3*a* of the mounting channel 3 and can clamp in an inserted information element 4 (not depicted) so that it cannot slip out.

Figure 1:
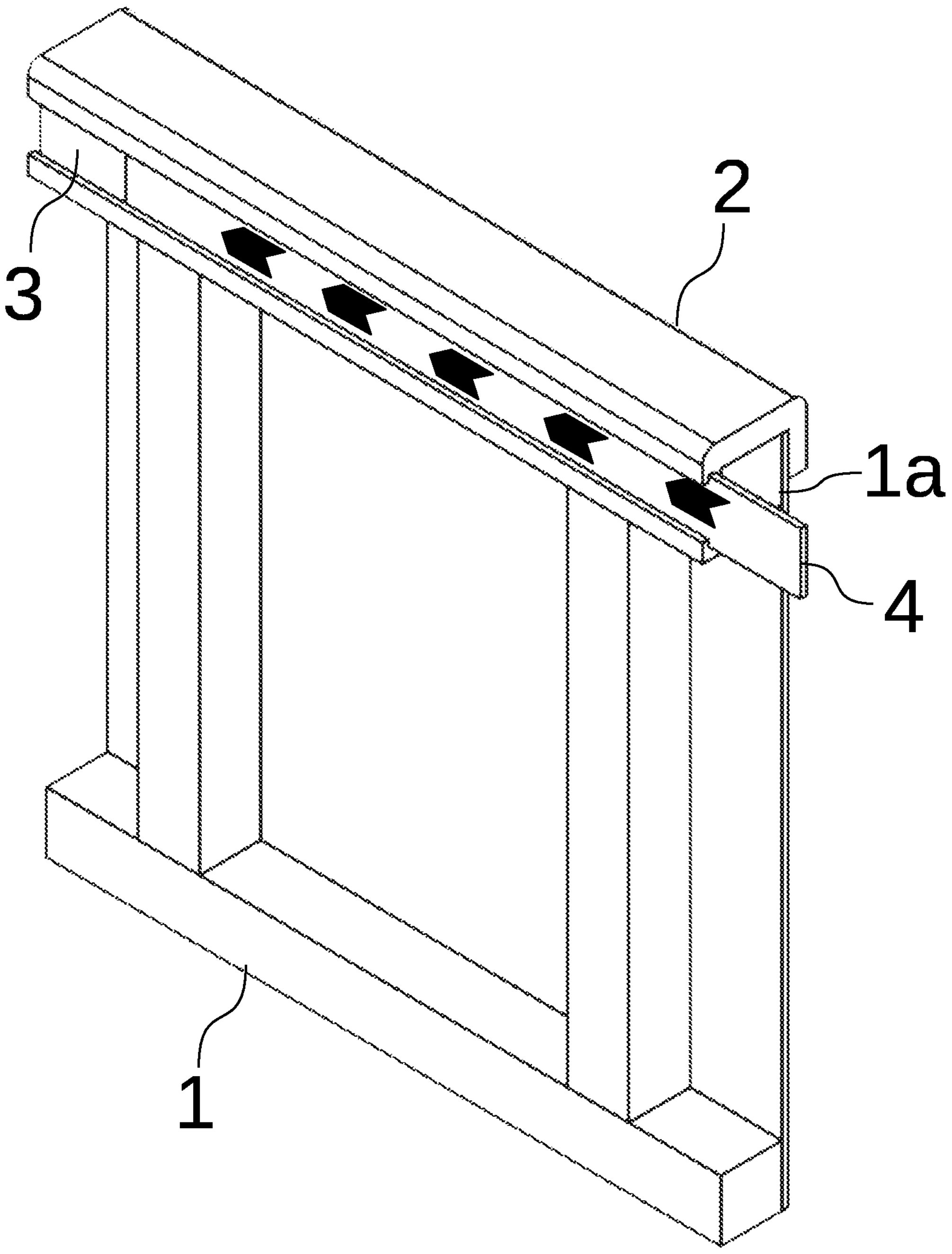
FIG. 1 shows an embodiment of a board according to the invention.
Figure 2:
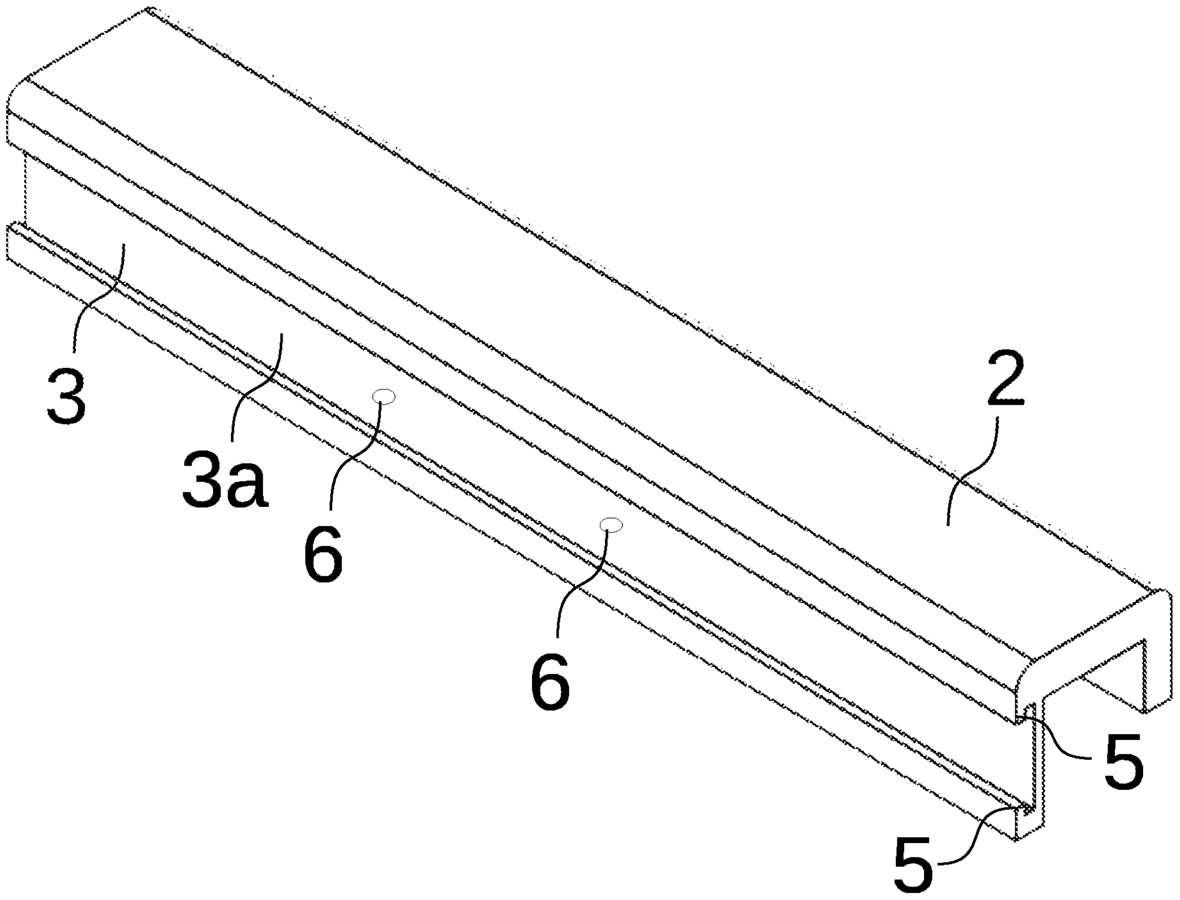
FIG. 2 shows an embodiment of a handrail according to the invention.
Figure 3:
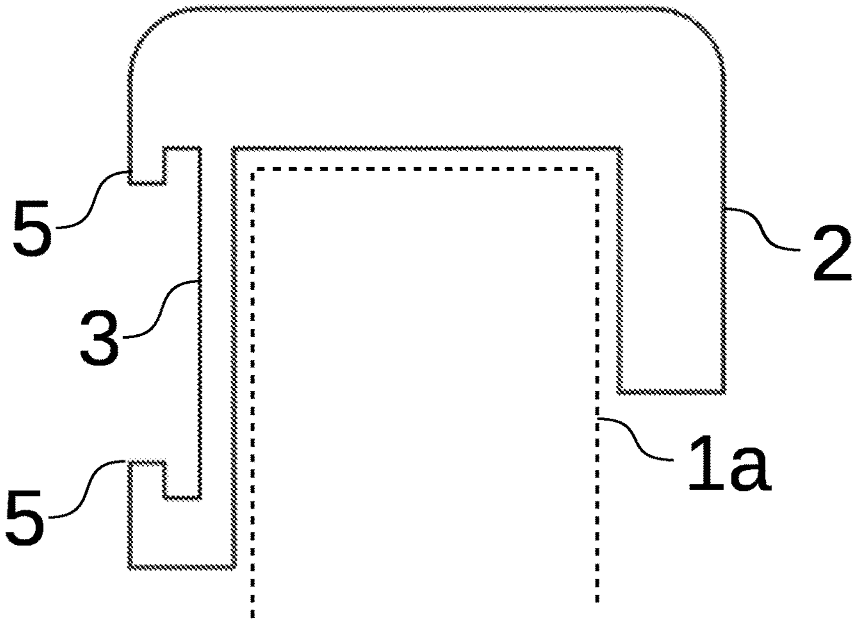
FIG. 3 shows a cross section through a preferred handrail.

FIG. 3 shows a cross section through a preferred handrail 2. This is the cross section of the handrail 2 depicted in FIG. 2. The upper edge 1*a* of a board 1, which the handrail 2, as explained above, can encompass, is depicted here in dashed lines. The mounting channel 3 is also depicted here in cross section. The two edge regions 5, which are arranged such that they can encompass an inserted information element 4 in a form-fitting manner, can be seen very clearly.

Figure 4:
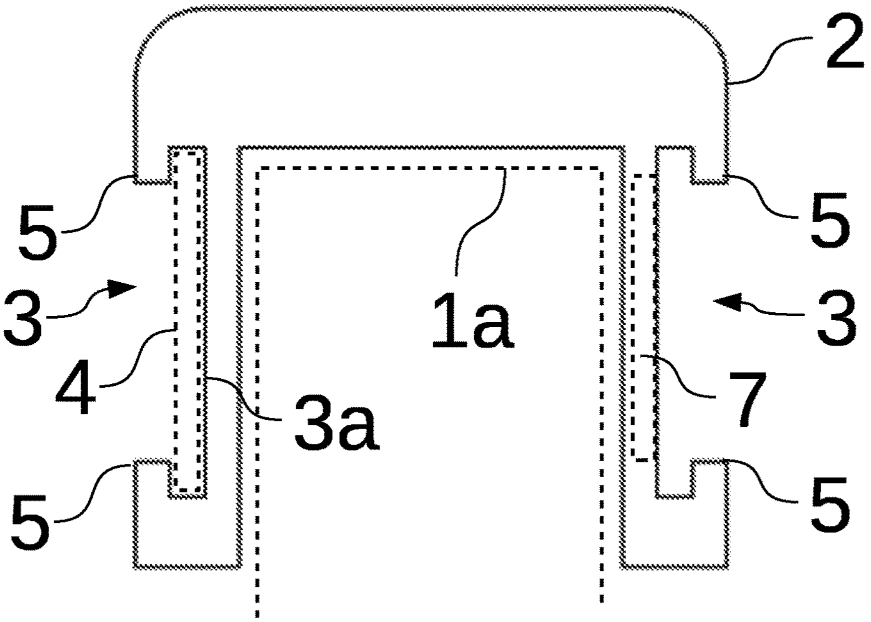
FIG. 4 shows a cross section through a further preferred handrail.

FIG. 4 shows a cross section through a further preferred handrail. Said cross section is constructed like that in FIG. 3, with the difference that a mounting channel 3 is located on each of the two sides for inserting and holding an information element 4 in a form-fitting manner. An optional information element 5 that is permanently glued in here is depicted in dashed lines on the left. Said information element could be located on the outside of the handrail 2 of a board 1, wherein any information elements 4 can then be inserted on the inside.

As an optional element, a lighting element 7 is delineated in dashed lines, which can illuminate from behind an information element 4 (not depicted) inserted into the left mounting channel 3.

Finally, it is pointed out once again that the devices described in detail above are merely embodiments which can be modified in a wide variety of ways by a person skilled in the art without departing from the scope of the invention. Furthermore, the use of the indefinite article "a" or "an" does not rule out the possibility that the characteristics in question can also be present more than once. Likewise, the terms "unit" and "device" do not exclude the possibility that these also consist of a plurality of sub-units, which may also be spatially separate.

LIST OF REFERENCE NUMBERS

1 board/board element
1*a* upper edge
2 handrail/handrail body
3 mounting channel
3*a* support surface
4 information element
5 edge region
6 clamping element
7 lighting element

The invention claimed is:

1. A board for a sports facility comprising a handrail at its upper edge, the handrail having a handrail body having a profile extending in a longitudinal direction, in the outer surface of which a mounting channel runs essentially over the entire length of the handrail, the handrail further comprising a groove in the lower area of the handrail body into which the upper edge of the board is inserted, wherein the which-mounting channel is designed to mount a flat information element, and wherein the mounting channel is formed on at least one of the inside and the outside of the handrail.

2. The board according to claim 1, wherein the board is designed as a board element for a mobile sports facility.

3. The board according to claim 1, wherein the minimum width of the mounting channel is 2 cm, wherein the width is constant over the entire length of the mounting channel, apart from optional clamping elements.

4. The board according to claim 1, wherein the minimum depth of the mounting channel is 2 mm, wherein the depth is constant over the entire length of the mounting channel, apart from optional clamping elements.

5. The board according to claim 1, wherein the mounting channel is designed for fastening an information element by being glued, clamped, screwed into it or fixed by means a magnetic fastening.

6. The board according to claim 1, wherein a mounting channel is preferably designed on both sides of the handrail.

7. The board according to claim 1, wherein the handrail is designed to mount a dynamic information element, wherein the handrail has at least one electrical contact point for this purpose in the region of the mounting channel and an electrical supply line from the contact points to a connection unit for connection to a data interface and to an electrical energy supply.

8. The board according to claim 1, wherein the handrail has a lighting unit in the region of the mounting channel, which lighting unit is designed and positioned such that light from the lighting unit illuminates an information element from above, below or behind.

9. A mobile sports facility, comprising the board according to claim 1.

10. A method for constructing a mobile sports facility, comprising the steps:

constructing the board of the mobile sports facility using the board according to claim 2, and introducing flat, strip-shaped, information elements into the handrail of the board.

11. The method for constructing a mobile sports facility according to claim 10, further comprising the step of:

constructing a floor of the mobile sports facility at least one of before and after the construction of the board.

12. The board according to claim 1, wherein the handrail is at least the length of the board element.

13. The board according to claim 12, wherein the handrail protrudes on one side of the board element.

14. The board according to claim 1, wherein the cross section of the mounting channel is designed such that the inner volume of the mounting channel has an undercut for holding an information element in a form-fitting manner.

15. The board according to claim 1, wherein the mounting channel is designed for inserting an information element on one side and comprises a permanently attached information element on the other side.

16. The board according to claim 8, wherein part of the mounting channel is made of a transparent material and the lighting unit is arranged inside the handrail behind the transparent material.

17. An ice skating rink comprising:

the board according to claim 1.

18. The method according to claim 10, further comprising the step of:

constructing the floor of the mobile sports facility before or after the construction of the board.

19. A handrail designed for attaching to a board, the handrail comprising a handrail body having a profile extending in a longitudinal direction, in the outer surface of which a mounting channel runs essentially over the entire length of the handrail, the handrail further comprising a groove in the lower area of the handrail body into which an upper edge of the board is inserted, wherein the mounting channel is designed for mounting a flat information element, and wherein the mounting channel is formed on at least one of the inside and the outside of the handrail.

20. A method for constructing a mobile sports facility, comprising the steps: constructing the handrail according to claim 19, and introducing flat, strip-shaped, information elements into the handrail of the board.

21. The method for constructing a mobile sports facility according to claim 20, further comprising the step of:

constructing a floor of the mobile sports facility at least one of before and after the construction of the board.

22. A mobile sports facility comprising a handrail according to claim 19.

23. A method for constructing a mobile sports facility, comprising the steps:

constructing the board of the mobile sports facility using the handrail according to claim 19, and introducing flat, strip-shaped, information elements into the handrail of the board.

24. An ice skating rink comprising:

the handrail according to claim 19.

* * * * *